UNITED STATES PATENT OFFICE.

JOHN B. SPENCE, OF LONDON, ENGLAND, ASSIGNOR TO J. B. UPHAM, TRUSTEE, OF BOSTON, MASSACHUSETTS; SAID UPHAM ASSIGNOR TO THE NATIONAL BELVEDERE METAL COMPANY, OF HARTFORD, CONNECTICUT.

MANUFACTURE OF METALLIC COMPOUNDS FROM SULPHUR AND SULPHIDES.

SPECIFICATION forming part of Reissued Letters Patent No. 9,982, dated December 20, 1881.

Original No. 238,980, dated March 15, 1881. Application for reissue filed November 17, 1881. Patented in England July 3, 1879, in France August 13, 1879, in Belgium March 13, 1880, and in Italy March 13, 1880.

DIVISION A.

*To all whom it may concern:*

Be it known that I, JOHN BERGER SPENCE, a subject of the Queen of Great Britain, and a resident of London, England, have invented a new and useful Improvement in the Manufacture of Metallic Compounds from Sulphur and Sulphides, (for which I have obtained a patent in Great Britain, bearing date July 3, 1879, in France, bearing date August 13, 1879, in Belgium, bearing date March 13, 1880, and in Italy, bearing date March 13, 1880,) of which the following is a specification.

My invention consists in combining metallic sulphides with sulphur for the production of a material which is applicable to various purposes in the arts.

In carrying out my invention I prefer to use the natural metallic sulphides, either singly or mixed, but preferably those of iron and copper. These natural ores I grind to an impalpable powder, and combine them by any suitable mechanical means with the sulphur while the sulphur is at a melting-point. On cooling, the compound will possess great hardness and tenacity and have a metallic luster. This compound I propose to designate as "Spence's Metal."

The proportion of the sulphur combined with the metallic sulphide or sulphides may vary from ten to forty per cent., according to the quality of the metal it is desired to produce; but I have found that for general use the addition of about thirty per cent. of sulphur will give good and useful results, a less proportion of sulphur producing a harder metal and a greater a softer metal.

The material thus obtained may be used for a great variety of purposes, both useful and ornamental. Thus, for example, when in a molten state it may be cast into various forms, such as statuary, vases, medallions, columns, moldings, cornices, and other ornamental work for buildings, hip, ridge, or other tiles, and gutters for roofs, or slabs and blocks for building purposes generally, for making drain or other pipes, either alone or in combination with other materials. The material may also be used, when in a molten state, for filling in the joints between the tiles and between the lengths of gutter, instead of mortar, cement, or solder, or instead of lead for stopping the joints of pipes. The material may also be employed for obtaining reproductions from complicated works of art by casting in elastic molds. It will also serve for taking impressions from engraved copper or steel plates, or for making stereotype-plates. It may also be used in the place of cement for plastering purposes generally. For this purpose I add only a small percentage of sulphur, which will give, when in a heated state, a plastic material capable of being readily worked with a trowel. It may also be used in the molten state as an enamel or paint for coating blocks and wall-surfaces, for the lining of cisterns, drain and other pipes, for the protection of metals from oxidation and of wood from decay, and for kindred purposes, for insulating telegraph-wires, or for sealing bottles containing wine or other liquors.

The material may be applied with a brush to the various surfaces, or, in the case of pipes, may be run through them in the liquid state. For insulating purposes the wires are drawn slowly through a bath of the heated liquid, and for sealing bottles the corks and necks are simply dipped therein.

I also propose to employ this metallic sulphide compound in place of sulphur when manufacturing vulcanized india-rubber and equivalent compounds. It will also be useful for coating paper and textile fabrics for rendering the same impervious to moisture. It may also be used in admixture with tar or pitch for asphalt. In some cases I may mix with the compound fibrous material to increase the strength.

The color of the material, which is naturally a dark gray, or nearly black, I modify by introducing into the mixture any suitable coloring-matter. The material, when cool and ground to a fine powder and mixed with oil, will produce a paint of great density and body. It may also be used to form a substitute for marble, and for this purpose it will have advantages over other artificial marbles, as it is unaffected by the action of the atmosphere and weather. To make the veining I use sulphur in the liquid state, which I mix with any suitable coloring-matter, and with a brush or piece of wood draw lines or make other marks to resemble veining, with this compound on the surface of the mold in which the slab or other article is to be cast, and then run in the required quantity of metal.

I claim as my invention—

The hereinbefore-described process of manufacturing metallic compounds, which consists in reducing natural metallic sulphides to a pulverulent condition and combining them with sulphur in a state of fusion, substantially as hereinbefore set forth.

In testimony whereof I have hereunto set my hand this 31st day of August, 1881.

J. BERGER SPENCE.

Witnesses:

J. DESVIGNES,
31 *Lombard St., E. C.*

JOHN DEAN,
17 *Gracechurch St., London, E. C.*